United States Patent [19]
Bahadur et al.

[11] Patent Number: 5,589,965
[45] Date of Patent: Dec. 31, 1996

[54] WIDE VIEWING-ANGLE DYE-DOPED TN LCD WITH RETARDATION FILMS

[75] Inventors: Birendra Bahadur, Etobicoke; Kam H. Wan, Mississauga, both of Canada

[73] Assignee: Litton Systems (Canada) Limited, Ontario, Canada

[21] Appl. No.: 264,300

[22] Filed: Jun. 23, 1994

[30] Foreign Application Priority Data

Jun. 24, 1993 [CA] Canada ................................ 2099642

[51] Int. Cl.$^6$ ...................... G02F 1/1335; C09K 19/60
[52] U.S. Cl. ........................................ 349/165; 349/119
[58] Field of Search ........................................ 359/73, 98

[56] References Cited

U.S. PATENT DOCUMENTS

| | | | |
|---|---|---|---|
| 3,900,248 | 8/1975 | Nagasaki | 359/73 |
| 4,505,546 | 3/1985 | Umeda et al. | 350/334 |
| 4,527,864 | 7/1985 | Dir | 359/55 |
| 4,852,976 | 8/1989 | Suzuki | 359/73 |
| 5,134,506 | 7/1992 | Kano et al. | 359/73 |
| 5,150,235 | 9/1992 | Haim et al. | 359/68 |
| 5,184,236 | 2/1993 | Miyashita et al. | 359/63 |

FOREIGN PATENT DOCUMENTS

| | | | |
|---|---|---|---|
| 62-257123 | 11/1987 | Japan | 359/98 |
| 1-304423 | 12/1989 | Japan . | |

OTHER PUBLICATIONS

Litton Systems Canada, Ltd., "Dichroic Liquid Crystal Displays", (Appeared in Liquid Crystals–Applications and Uses, vol. III, Published by World Scientific Singapore, 1992), pp. 65–208, drawings (7 pages).

Litton Data Images, "Current Status of Dichroic Liquid Crystal Displays", B. Bahadur, 1991, pp. 1–33.

316 Japan Display '89, Yamagishi et al., 3 pages.

Nitto Denko Corporation, "Retardation Film for LCD", Tatsuki Nagatsuka et al. (17 pages).

*Primary Examiner*—William L. Sikes
*Assistant Examiner*—Charles Miller
*Attorney, Agent, or Firm*—Staas & Halsey

[57] ABSTRACT

A wide viewing-angle twisted nematic liquid crystal display is provided. The wide viewing-angle is achieved by the application of properly aligned retardation films in between a 90° twisted nematic liquid crystal cell and one of two polarizers, as well by doping the liquid crystal with an appropriate amount of dichroic dye molecules. These two additional elements not only increase the viewing-angle but also improve the chromaticity of the display. The retardation films convert the polarization state of the transmitted light of the liquid crystal cell to a more linearly polarized light in order to achieve higher contrast ratio at −45° and +45° scanning direction relative to the rub direction of the back substrate of the cell. The dichroic dye molecules operate on the absorption principle and further improve the contrast ratio along a 90° scanning direction. By combining both elements in a liquid crystal display, a much wider viewing-angle is achieved.

11 Claims, 6 Drawing Sheets

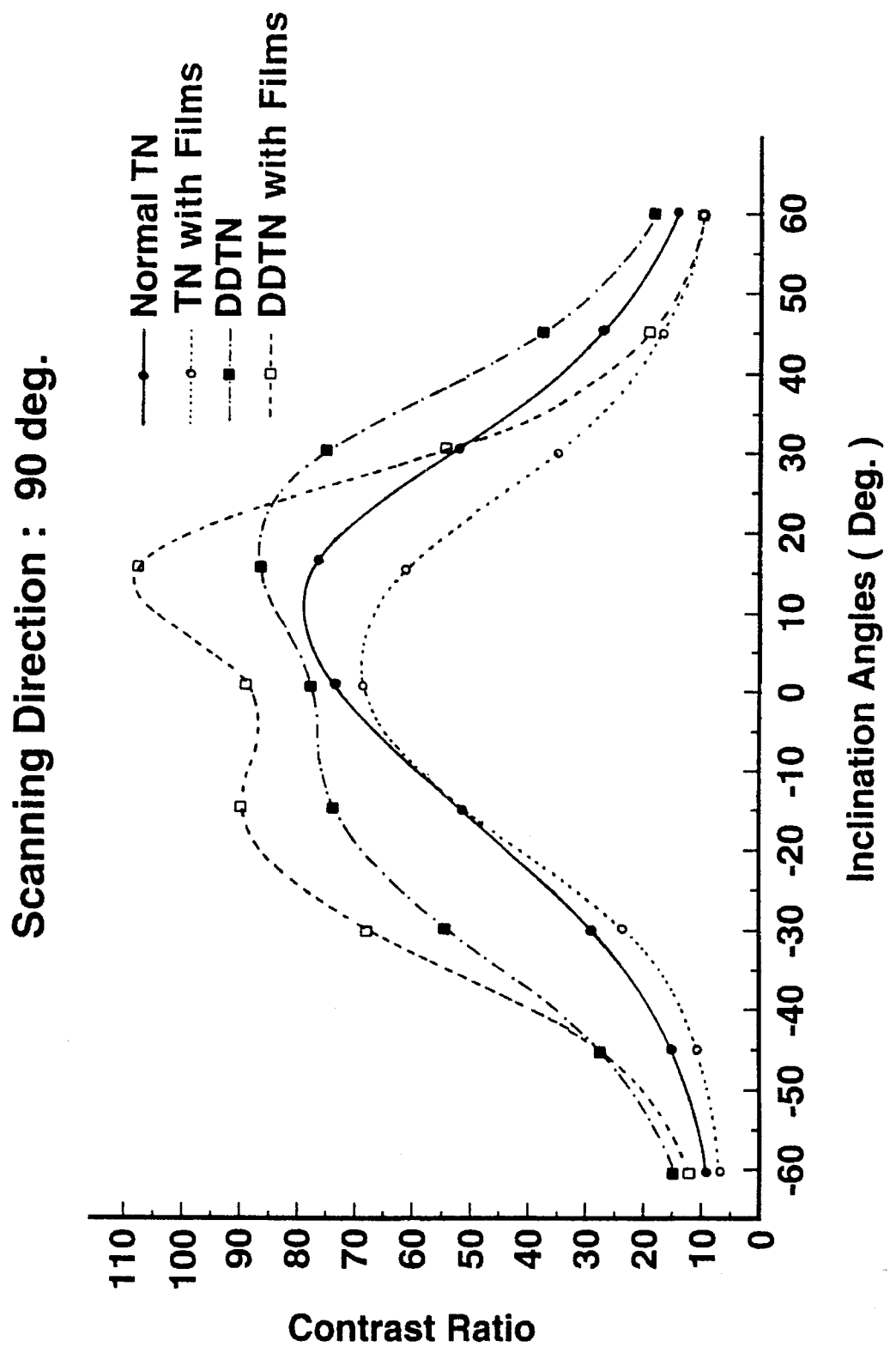

WIDE VIEWING-ANGLE DYE-DOPED TN LCD WITH RETARDATION FILMS

FIELD OF THE INVENTION

The present invention relates in general to liquid crystal displays (LCDs) and more particularly to a dye-doped twisted nematic (TN) LCD with retardation films for providing improved contrast ratio and chromaticity.

BACKGROUND OF THE INVENTION

Luminance contrast ratio, besides other measurements, is used to characterize the viewing-angle of a liquid crystal display. The luminance contrast ratio (CR) is defined, for a normally black display as, the ratio of the on-state transmitted luminance ($I_{on}$) to that of the off-state ($I_{off}$), as follows:

$$CR=I_{on}/I_{off}.$$

The operational principle of a TN LCD display is based on the electric field controllable birefringence of the liquid crystal layer. The polarization state of a light beam after passing through the liquid crystal layer depends on the length of the optical path, the twist angle and the birefringence of the nematic liquid crystal. In a normally black TN LCD display the cell gap is normally optimized such that when the cell is in the off-state, at normal incidence, the polarization state of the light passed through the 90° twisted liquid crystal layer is linear and perpendicular to the transmission axis of the exit polarizer. This gives a low $I_{off}$ and therefore a high contrast ratio. When the inclination angle (which is measured of of normal from the display surface) increases, the optical path increases and the effective birefringence of the liquid crystal layer changes. Consequently, the polarization state of the light passed through the cell becomes more and more elliptical as the inclination angle increases. Therefore, transmission increases and the contrast ratio decreases.

It has been discovered in the prior art that retardation films may be used to partially compensate for the change in effective birefringence of the liquid crystal layer as a result of increasing inclination angle, such that within a larger inclination angle the linearly polarized light beam passing through the retardation films and the cell remains fairly linearly polarized. The following prior art publications relate to the use of retardation films in LCDs: (1) Yamagishi, N., Watanabe H., Yokoyama, K., "Wide Viewing Angle LCD Using Retardation Film" Japan Display 189, page 316; and (2) Nagatsuka, Tatsuki, and Yoshimi, Hiroyuki, "Retardation Films for LCD" technical paper released in 1989 by Nitto Denko corporation, Tokyo, Japan.

The use of retardation films in liquid crystal displays developed from research in super-twisted nematic (STN) displays. Because of the large twist angle, STN displays exhibit strong yellow or blue coloration. The use of retardation films provides an economical and lightweight solution for removing such coloration.

In addition to the use of retardation films, researchers in liquid crystal technology have examined a number of other alternatives to broaden the viewing angle of LCDs. These methods include the use of tilted homeotropic alignment, the use of double cells, and the use of two-domain alignment.

Dichroic dyes have also been widely used in liquid crystal displays. The majority of dichroic displays operate using a phase change mode with contrast ratio of approximately 25:1 in reflective mode, and approximately 5:1 in transmissive mode. A discussion of the use of dichroic dyes in liquid crystal display technology is provided in the following publications: Bahadur, Birendra, "Current Status of Dichroic Liquid Crystal Displays", Mol. Cryst. Liq. Cryst., 1991, volume 209; and Bahadur Birendra "Dichroic LCDs" in the book "Liquid Crystals—Applications and Uses", volume III, B. Bahadur editor, published by World Scientific, Singapore (1992). Unfortunately, research in the application of dichroic dyes to LCDs has been somewhat curtailed by a general mis-apprehension of LCD researchers concerning the photo and chemical stability of such dyes and the related problems.

SUMMARY OF THE INVENTION

According to the present invention an improved TN LCD display is provided with a wider viewing-angle than is possible using retardation films alone. Specifically, according to the present invention, a carefully selected quantity of dichroic dye is added to a carefully selected liquid crystal. The display according to the present invention comprises a cell, as is used in well known prior art TN LCD displays, filled with a novel mixture of liquid crystal and dichroic dye. Two retardation films with orientations similar to that described in the prior art are laminated on one side of the cell. Finally, two polarizers are laminated on opposite sides of the assembled structure. The resulting display is characterized not only by wide viewing-angle along the 45° scanning detection, but also along the 90° scanning direction. Furthermore, the display is characterized by smaller chromaticity variation with viewing direction.

Various aspects of the present invention are provided as follows:

A liquid crystal display, comprising:

a) a cell containing twisted nematic liquid crystal having a predetermined percentage of dichroic dye mixed therein for maximizing contrast ratio at a 90° scanning direction to said cell;

b) a first polarizer adjacent one side of said cell and having a first polarization axis;

c) a second polarizer adjacent an opposite side of said cell and having a second polarization axis approximately parallel to said first polarization axis; and d) a pair of retardation films intermediate said cell and said second polarizer, said pair of retardation films having respective slow axes thereof oriented at predetermined angles to said first polarization axis for maximizing contrast ratio at −45° and +45° scanning directions to said cell.

In a liquid crystal display comprising a cell containing 90° twisted nematic liquid crystal intermediate a pair of polarizers, and a pair of retardation films intermediate said liquid crystal cell and one of said pair of polarizers, the improvement comprising a predetermined percentage of dichroic dye mixed into said nematic liquid crystal for maximizing contrast ratio at a 90° scanning direction to said cell.

A method of fabricating a liquid crystal display, comprising the steps of:

a) evaporating a first transparent ITO layer on an inner surface of a first glass substrate and then patterning it in desired electrode patterns;

b) evaporating a second transparent ITO layer on an inner surface of a second glass substrate and then patterning it in desired further electrode patterns;

c) generating a first homogeneous alignment layer oriented in a first predetermined direction on top of said first transparent ITO layer;

d) generating a second homogeneous alignment layer oriented in a second predetermined direction on top of said second transparent ITO layer, said second predetermined direction being approximately perpendicular to said first predetermined direction;

e) laminating and bonding said first glass substrate to said second glass substrate so as to form a cell;

f) filling said cell with a dye doped liquid crystal;

g) laminating a first polarizer to said first glass substrate with its transmission direction approximately perpendicular to said first predetermined direction;

h) gluing a pair of retardation films to said second glass substrate such that a slow axis of a first one of said retardation films is approximately parallel to said second predetermined direction and a slow axis of a second one of said retardation films is approximately +3° to +5° from said first predetermined direction; and i) laminating a second polarizer to said second one of said retardation films with its transmission direction approximately perpendicular to the slow axis of said second one of said retardation films.

BRIEF DESCRIPTION OF THE DRAWINGS

A detailed description of the preferred embodiment is provided herein below with reference to the following drawings, in which:

FIGS. 2A, 2B, 2C and 2D show typical contrast ratios obtained along four different viewing directions, respectively, for a normal TN display, a TN display with retardation films, a dye-doped TN display and a dye doped TN display with retardation films according to the present invention.

DETAILED DESCRIPTION OF THE PREFERRED EMBODIMENT

Figure 1A:
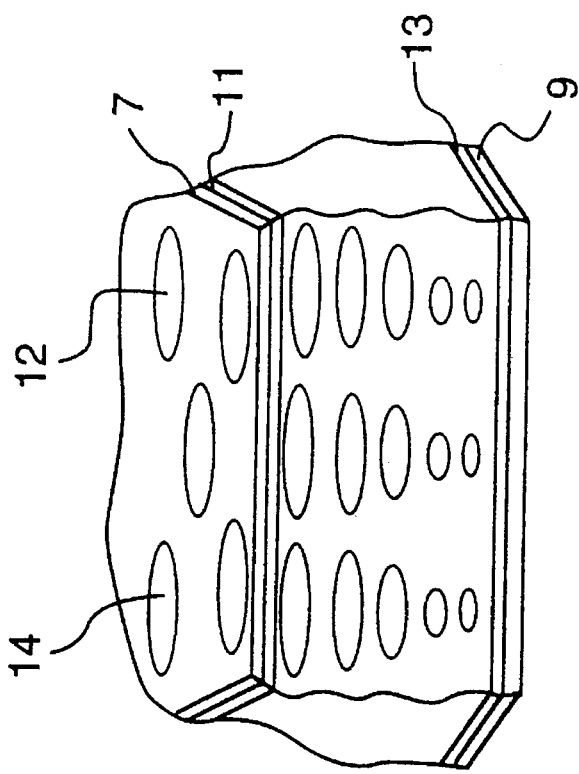
FIG. 1A is a schematic diagram of a liquid crystal display according to a preferred embodiment of the present invention.
Figure 1B:
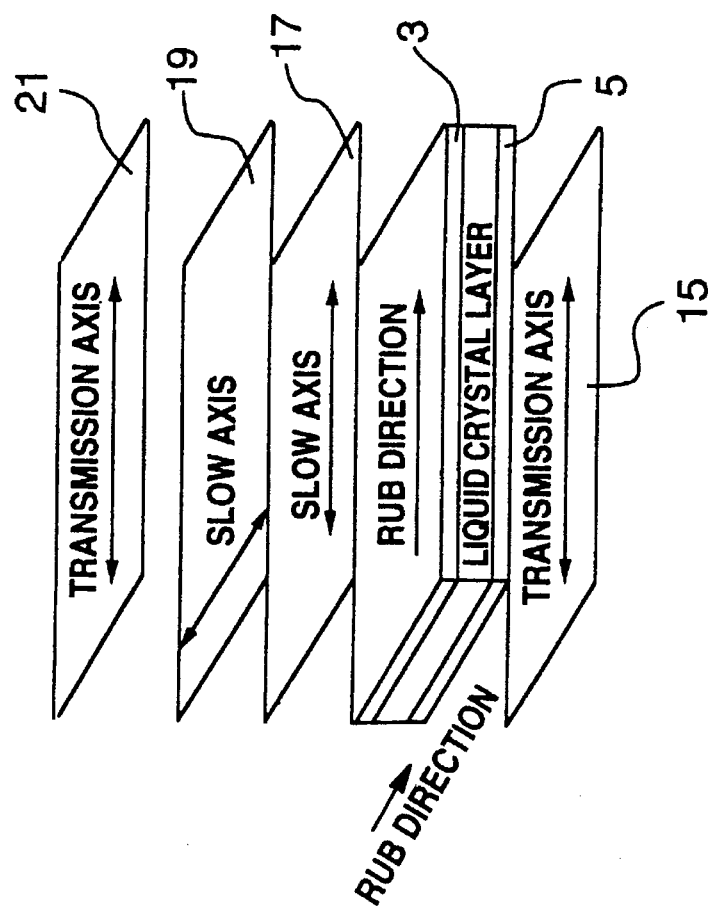
FIG. 1B is an expanded view of a liquid crystal layer of the display in FIG. 1A.

FIG. 1A is a schematic diagram of a liquid crystal display constructed according to the preferred embodiment. As shown in greater detail with reference to FIG. 1B, a liquid crystal cell is provided comprising two glass substrates 3 and 5 with thin transparent ITO (indium tin oxide) layers 7 and 9 evaporated on the inner surfaces thereof. Polyimide layers 11 and 13 are coated on top of the respective ITO layers 7 and 9 for aligning the liquid crystal molecules within the cell. Thus, for a left-hand twisted cell, the polyimide layer 13 on the bottom substrate 5 is rubbed along the 0° direction (Cartesian coordinates), while the top polyimide layer 11 is rubbed along the 90° direction (according to the right hand rule in Cartesian coordinates). The spaces between glass substrates 3 and 5 are 5 µm diameter glass fibers (not shown).

Although layers 11 and 13 are preferably of polyimide, any homogenous alignment material may be used for orienting the liquid crystal molecules, within the scope of the present invention. For example, it is contemplated that the layers 11 and 13 can be formed of silane, evaporated silicon monoxide or similar alignment materials.

The glass substrates 3 and 5 are bonded together to form a cell using preferably either Noland 61 UV epoxy or Able bond 681-14 thermal cured epoxy or thermoplastic material.

Next, the cell is filled with liquid crystal by either vacuum filling or by a capillary method. According to the preferred embodiment, Merck ZLI3788 or ZLI4792 is used as the host liquid crystal. Approximately 0.5–1.0% wt of chiral compound C 15 is added to stabilize the handedness of the twist of the liquid crystal molecules. Approximately 0.5% wt of proprietary D12A black dye (which consists of a mixture of pleochroic anthraquinone and azo dyes) is added to the host liquid crystal. This mixture is well stirred and heated to approximately 110° C. for 15 minutes.

After filling, the cell is sealed preferably with Noland 61 UV epoxy. A uniform pressure is applied over the cell during sealing to improve the uniformity of the cell gap.

As seen in FIG. 1A, the polyimide layers 11 and 13 (or other suitable homogeneous alignment material) effectively orient molecules of liquid crystal material 12 and molecules of dye material 14 in accordance with the rubbing directions thereof.

A bottom polarizer 15 (preferably Sanritsu 9218) is laminated with its transmission direction perpendicular to the rub direction of the polyimide layer on the bottom substrate.

Two retardation films 17 and 19, each characterized by approximately 300 nm retardation and being approximately 25 µm thick, are glued on top of the cell preferably using Noland UV optical epoxy. The slow axis of the first film 17 is parallel to the rub direction of the polyimide layer 11 on the top substrate 3. The slow axis of the second film 19 is approximately +3° to +5° from the rub direction of the polyimide surface 13 on the bottom substrate 5.

A top polarizer 21 is laminated with its transmission direction perpendicular to the slow axis of the top retardation film 19.

In order to test the performance of the liquid crystal display according to the present invention, a further test cell was filled with the same liquid crystal but without dye doping. The measurements of the transmission from the two cells, with and without retardation films, yielded data concerning the different contributions to increased viewing angle from the use of dye doped liquid crystal material and the use of retardation films.

Figure 2A:
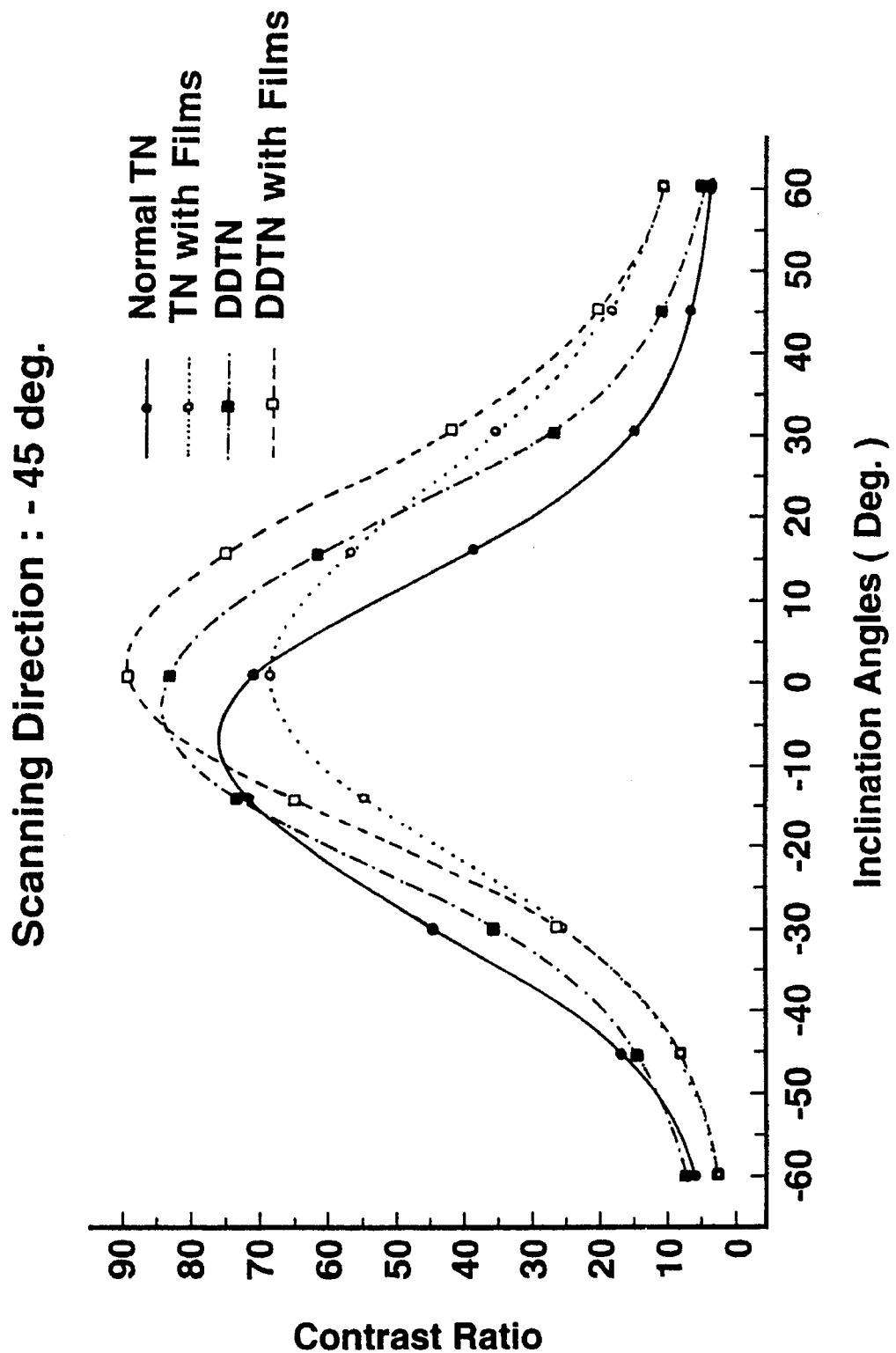
Figure 2B:
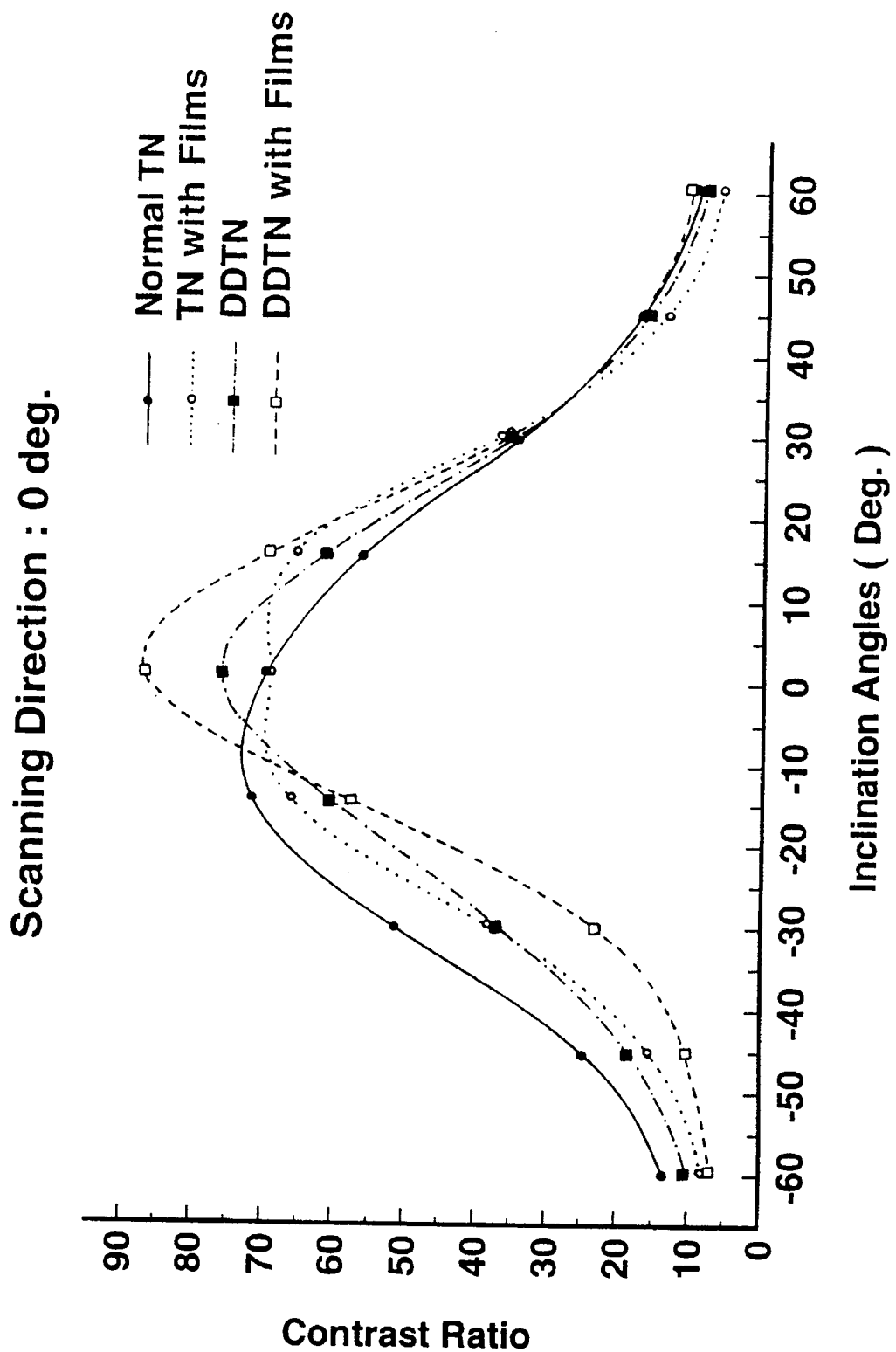
Figure 2C:
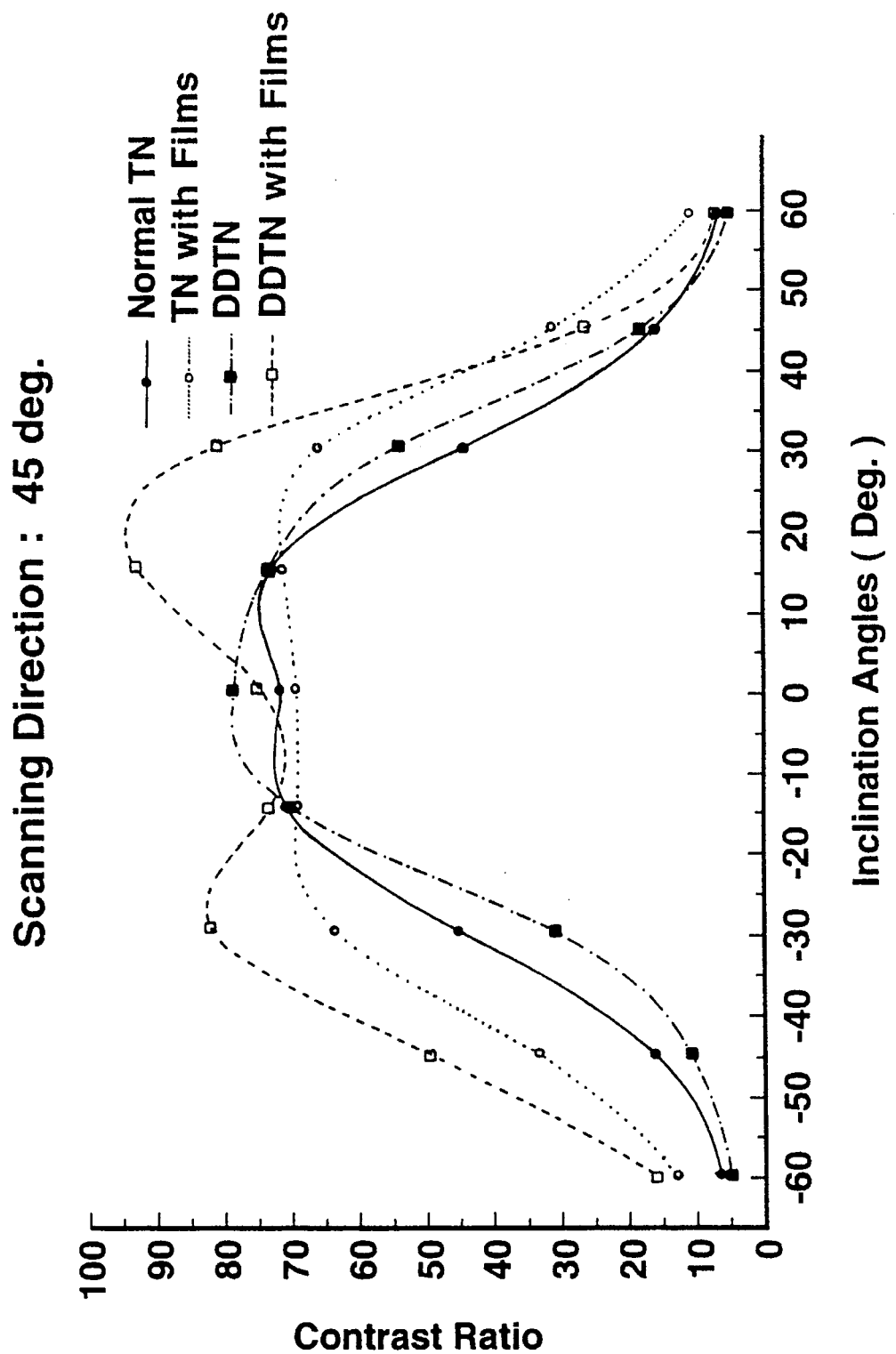
Figure 3:
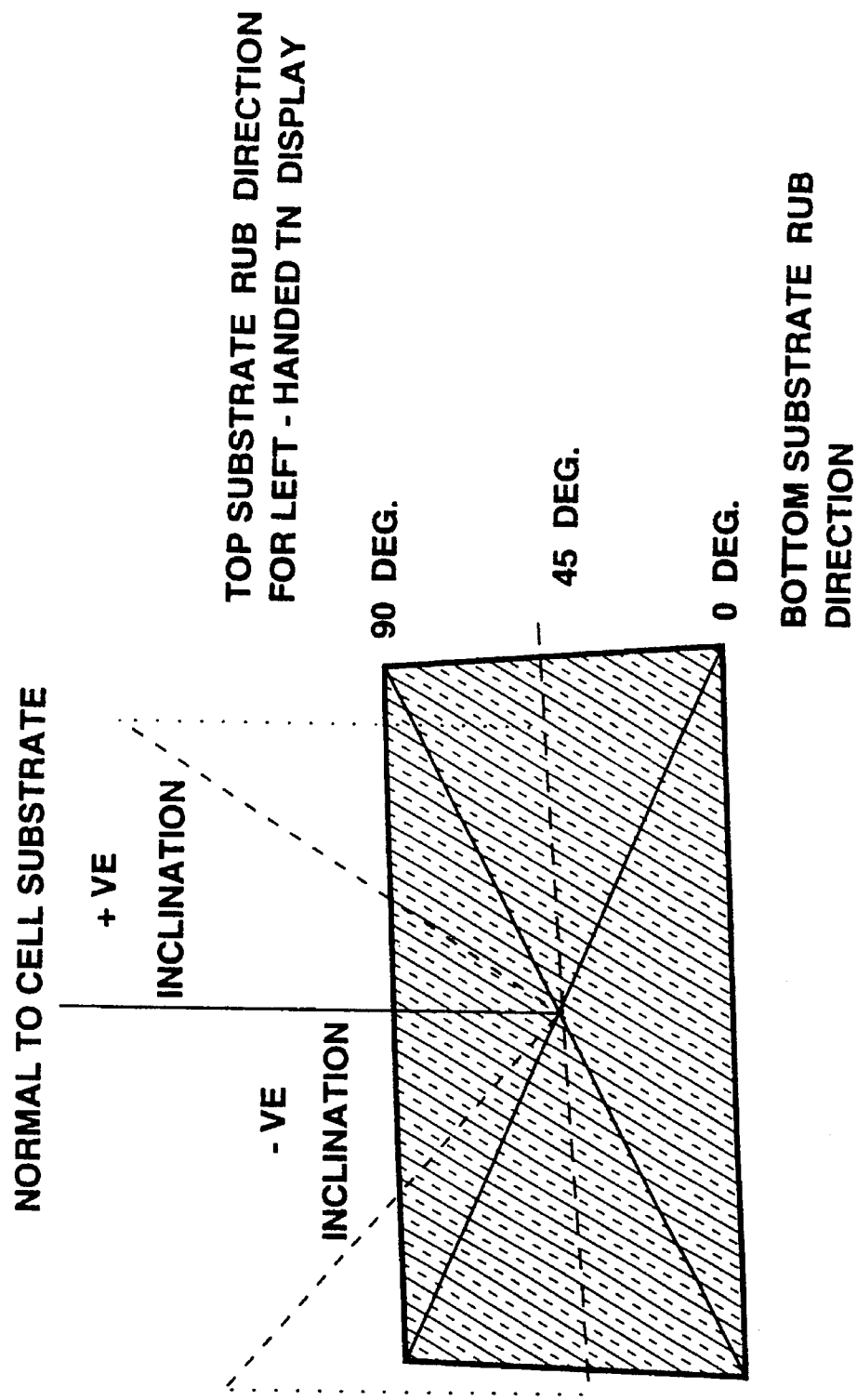
FIG. 3 illustrates the coordinate system used in this disclosure and in the contrast ratio measurement depicted in FIGS. 2A, 2B, 2C and 2D.

FIGS. 2A, 2B, 2C and 2D show measured contrast ratio versus inclination angle measured along different viewing directions. An applied voltage of 8 volts was used in the on-state transmission measurement. For example, FIG. 2C shows the contrast ratio within +60° to –60° inclination of a normal TN cell, a TN cell with retardation films, a dye-doped TN cell, and a dye-doped TN cell with retardation films along the 45° scanning direction. FIG. 3 shows the scanning directions of these measurements.

The effect of the retardation films on improving the viewing angle can be readily seen by comparing the (•) and (°) curves in FIGS. 2A, 2B, 2C and 2D. Consistent with discoveries known from the prior art literature, the retardation films have a profound effect along the 45° viewing direction. Along the other three viewing directions, viewing angle is seen to be less than adequate.

Doping the liquid crystal with a small amount of neutral dye alone is seen to result in a dramatic improvement in contrast ratio along the 90° scanning direction, but not along the 45° direction, as seen by comparing the (·) and the (■) curves in FIGS. 2A, 2B, 2C and 2D. However, when both dye and retardation films are used together in accordance with the present invention, the overall improvement along both the 45° and 90° direction increases, as seen by comparing the (•) and (□) curves. The improvement of dye-doped TN with retardation films over TN with retardation films but no dye doping can be seen by comparing curves (°) and (□). Dye doping with retardation films is seen to result in improvement in scanning directions −45°, 45° and 90°.

The amount of dye mixed into the host liquid crystal has to be carefully selected. The improved contrast ratio effect can be obscured if too little dye is used. On the other hand, an excess of dye reduces the contrast ratio drastically and causes dye segregation. The acceptable range of dye content is 0.2 to 2.0 % wt. However, a preferred amount of dye is 0.5 % wt. As discussed above, general lack of knowledge by researchers in the field concerning the photo and chemical stability of dyes has led such workers away from the use of dyes in addressing the problem of viewing angle in TN displays.

As discussed above, the function of dichroic dyes is based on absorption. Furthermore, this dye effect is more symmetrical to the normal direction of the display than the birefringence effect. This is the reason why the effect of dye doping is particularly obvious along the 90° direction where the contrast ratio of a normal TN display is more asymmetric.

As discussed in the prior art literature, the use of retardation films reduces the variation of chromaticity over different viewing angles. With the addition of a carefully selected amount of dye in combination with the use of retardation films, the chromaticity variation can be further reduced in accordance with the principles of the present invention.

Other embodiments and modifications of the invention are possible. For example, in addition to the left-handed 90° twisted version of the liquid crystal display illustrated in FIG. 1, a right-handed 90° twisted version may be constructed. Also, it is possible to mount the retardation films on the opposite side of the cell from the mounting illustrated in FIG. 1. Both such alternative embodiments of the invention are characterized by similar viewing angle improvements as described above. All such modifications and variations are believed to be within the sphere and scope of the present invention as defined by the claims appended hereto.

The embodiments of the invention in which an exclusive property of privilege is claimed are defined as follows:

1. A liquid crystal display, comprising:
    a) a cell containing twisted nematic liquid crystal having a predetermined percentage of black dichroic dye mixed therein for maximizing contrast ratio at a 90° scanning direction to said cell;
    b) a first polarizer adjacent one side of said cell and having a first polarization axis;
    c) a second polarizer adjacent an opposite side of said cell and having a second polarization axis approximately parallel to said first polarization axis; and
    d) a pair of retardation films intermediate said cell and said second polarizer, said pair of retardation films having respective slow axes thereof oriented at predetermined angles to said first polarization axis for maximizing contrast ration at −45° and +45° scanning directions to said cell.

2. The liquid crystal display of claim 1, wherein said predetermined percentage of black dichroic dye is approximately 0.2–2.0% wt.

3. The liquid crystal display of claim 2, wherein said one side of said cell includes a first layer of alignment material for aligning adjacent molecules of said nematic liquid crystal and said dichroic dye approximately perpendicular to said first polarization axis, and said opposite side of said cell includes a second layer of alignment material for aligning adjacent molecules of said nematic liquid crystal and said dichroic dye approximately parallel to said first polarization axis.

4. The liquid crystal display of claim 3, wherein the slow axis of a first one of said pair of retardation films adjacent said cell is approximately parallel to said first polarization axis and the slow axis of a second one of said retardation films adjacent said second polarizer is approximately +3° to +5° from perpendicular to said first polarization axis.

5. The liquid crystal display of claim 4, wherein said second polarization axis is approximately perpendicular to said slow axis of said second one of said retardation films.

6. The liquid crystal display of claim 3, wherein said first layer of alignment material and said second layer of alignment material are fabricated from rubbed polyimide, or evaporation of silicon oxide, or silane or similar alignment materials.

7. The liquid crystal display of claim 3, further comprising first and second ITO layers adjacent said first layer of alignment material and said second layer of alignment material, respectively, for applying an electric field to said cell.

8. The liquid crystal display of claim 1, wherein each of said pair of retardation films has a retardation of approximately 300 nm.

9. In a liquid crystal display comprising a cell containing 90° twisted nematic liquid crystal intermediate a pair of polarizers and a pair of retardation films intermediate said liquid crystal cell and one of said pair of polarizers, the improvement comprising a predetermined percentage of dichroic black dye mixed into said nematic liquid crystal for maximizing contrast ratio at a 90° scanning direction to said cell.

10. The improvement of claim 9, wherein said nematic liquid crystal further includes an appropriate amount of chiral compound for stabilizing handedness of molecular twist of said nematic liquid crystal.

11. A method of fabricating a liquid crystal display, comprising the steps of:
    a) evaporating a first transparent ITO layer on an inner surface of a first glass substrate and then patterning it in desired electrode patterns;
    b) evaporating a second transparent ITO layer on an inner surface of a second glass substrate and then patterning it in desired further electrode patterns;
    c) generating a first homogenous alignment layer oriented in a first predetermined direction on top of said first transparent ITO layer;
    d) generating a second homogenous alignment layer oriented in a second predetermined direction on top of said second transparent ITO layer, said second predetermined direction being approximately perpendicular to said first predetermined direction;
    e) laminating and bonding said first glass substrate to said second glass substrate so as to form a cell;
    f) filling said cell with a dye-doped liquid crystal, said dye-doped liquid crystal including a black dichroic dye;

g) laminating a first polarizer to said first glass substrate with its transmission direction approximately perpendicular to said first predetermined direction;

h) gluing a pair of retardation films to said second glass substrate such that a slow axis of a first one of said retardation films is approximately parallel to said second predetermined direction and a slow axis of a second one of said retardation films is approximately 3° to 5° from said first predetermined direction; and i) laminating a second polarizer to said second one of said retardation films with its transmission direction approximately perpendicular to the slow axis of said second one of said retardation films, wherein said dye-doped liquid crystal is fabricated by dissolving an appropriate amount of chiral compound and approximately 0.2–2.0 % wt of black dye to said host liquid crystal.

* * * * *